Feb. 4, 1958 D. T. PEDEN 2,822,178
SPRING FINGERED CHUCK
Filed Aug. 10, 1955 3 Sheets-Sheet 3
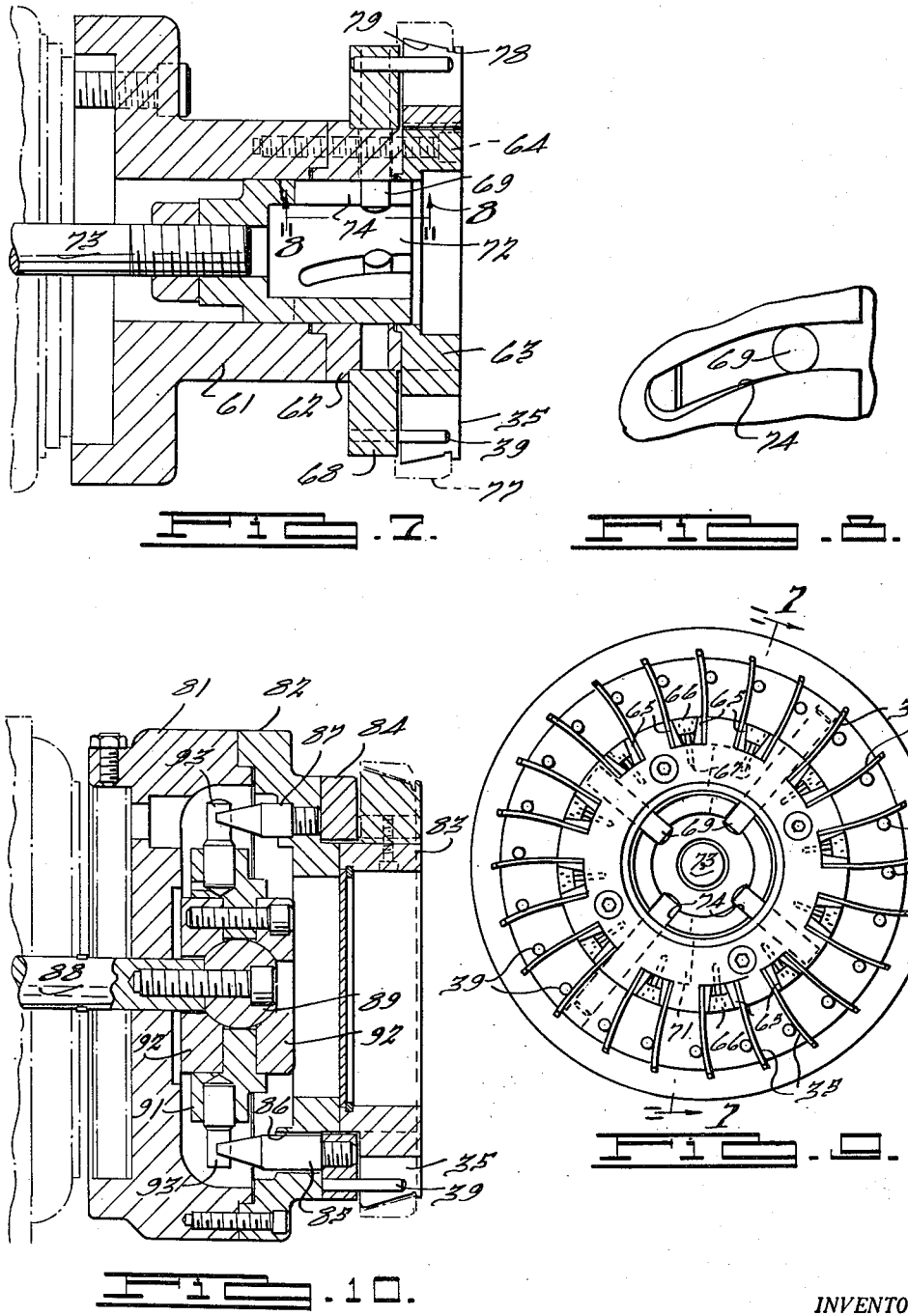
INVENTOR.
Douglas T. Peden.
BY
Harness, Dickey & Pierce.
ATTORNEYS.

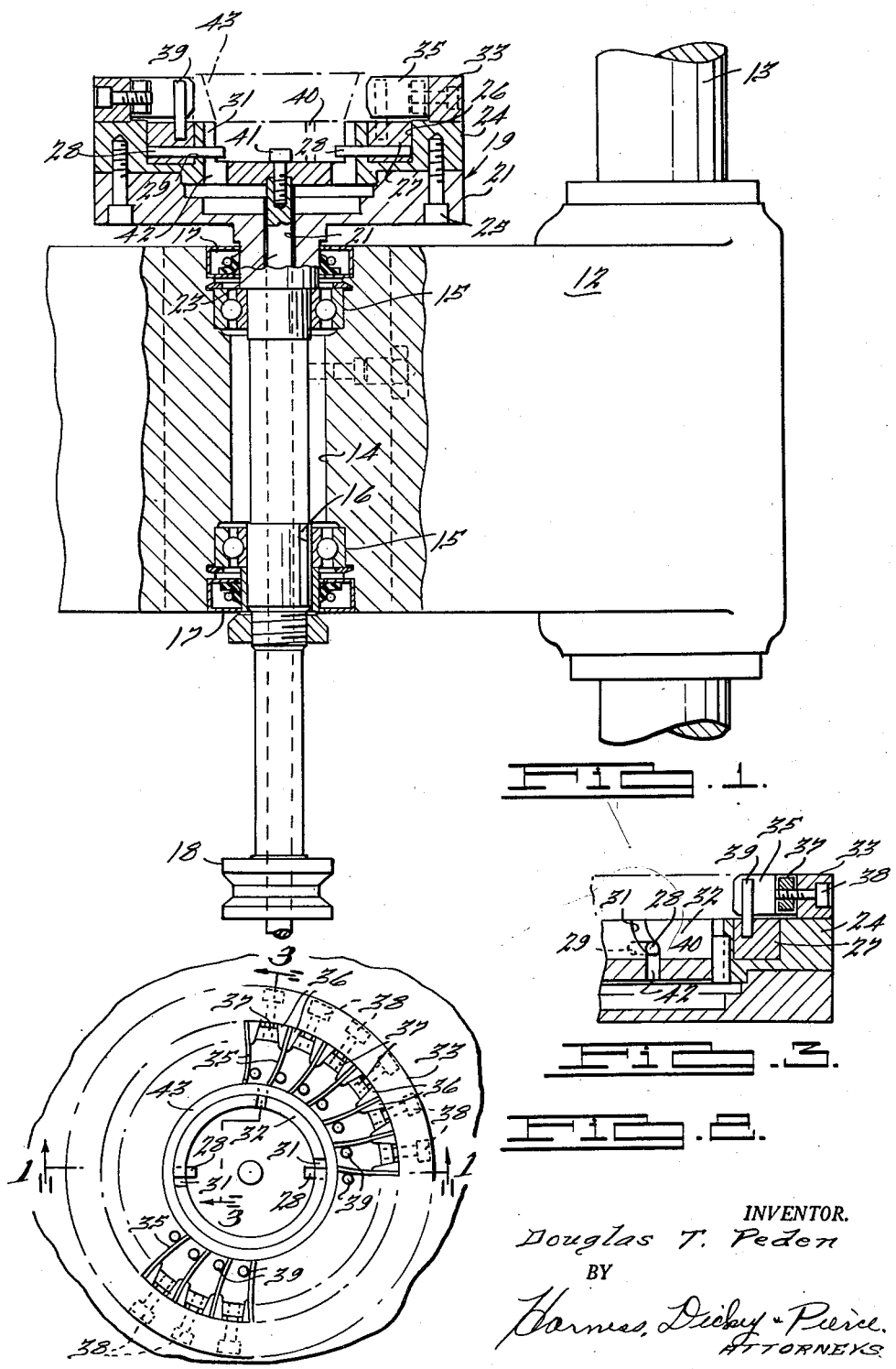

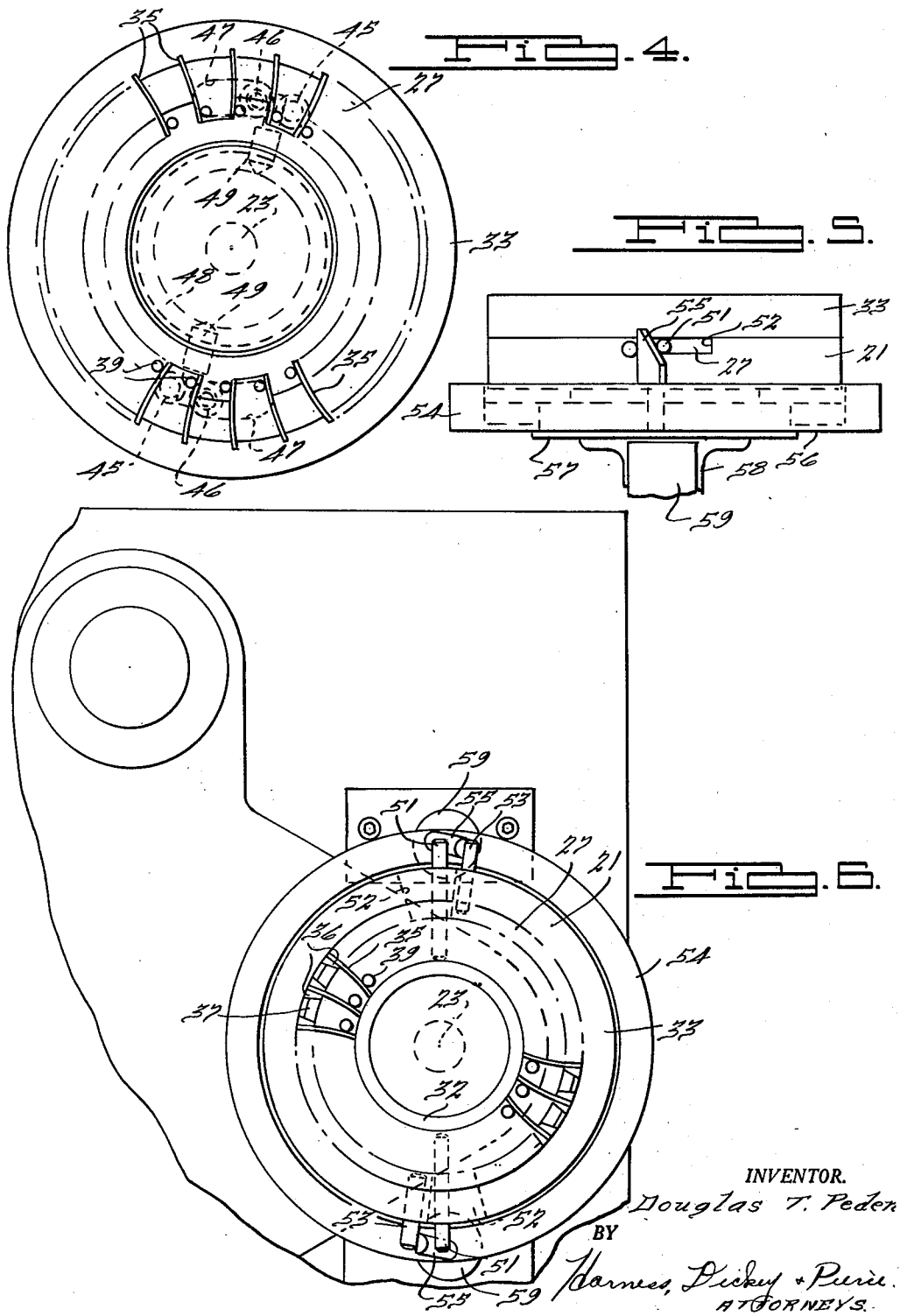

United States Patent Office 2,822,178
Patented Feb. 4, 1958

2,822,178

SPRING FINGERED CHUCK

Douglas T. Peden, Ann Arbor, Mich., assignor to Micromatic Hone Corporation, Detroit, Mich., a corporation of Michigan Application August 10, 1955, Serial No. 527,523

5 Claims. (Cl. 279—106)

This invention relates to chucks of the spring fingered type, and particularly to a spring fingered chuck having means for expanding and contracting the opening defined by the ends of the fingers and for ejecting the workpieces therefrom.

Spring fingers have been employed heretofore for overrunning clutches acting between an inner and outer ring for locking the rings together in one direction of rotation and for releasing the rings when one of the rings is driven in the opposite direction.

The present invention pertains to a chuck wherein the workpiece functions as a second ring which is locked by the ends of the spring finger supported in the second ring. In the present arrangement, the spring fingers are rigidly supported at one end, while in the chuck both ends are free. Wedge means are employed for moving pins relative to the fingers to cause the spring fingers to bend and the ends to release the work so that it may be removed from the chuck. In combination with such a spring type of clutch, an ejecting mechanism is employed by which the workpiece is raised from a position within the fingers to a position thereabove so that it may be readily removed.

Accordingly, the main objects of the present invention are: to provide a ring with a plurality of radially disposed spring fingers, the ends of which define a circle, oval or like configuration; to provide a plate with a plurality of studs which are alternately disposed with a plurality of radially disposed spring fingers which are deflected by the studs when the plate is rotated to increase the diameter of a circle defined by the ends of the fingers; to provide a wedging mechanism for rotating a ring having studs thereon for deflecting the spring fingers of a clutch to enlarge the configuration defined by the ends of the fingers to release and discharge a workpiece from the clutch; to provide a platform for a spring fingered clutch which is raised after the fingers have been deflected to release the workpiece to discharge the workpiece from the clutch, and, in general, to provide a spring fingered type of clutch having wedging means for deflecting the finger and raisable means for discharging the work, all of which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a broken sectional view of a machine having a spring fingered chuck thereon and operating mechanism therefor, taken on the line 1—1 of Fig. 2;

Fig. 2 is a broken plan view of the structure illustrated in Fig. 1;

Fig. 3 is an enlarged, broken sectional view of the structure illustrated in Fig. 2, taken on the line 3—3 thereof;

Fig. 4 is a view of structure, similar to that illustrated in Fig. 2, showing a different form which the chuck may assume;

Fig. 5 is a view in elevation of the structure illustrated in Fig. 4;

Fig. 6 is a view of structure, similar to that illustrated in Fig. 2, showing another form of the invention;

Fig. 7 is a sectional view of the structure illustrated in Fig. 9, taken on the line 7—7 thereof;

Fig. 8 is an enlarged, broken view of a portion of the structure illustrated in Fig. 7, as viewed from line 8—8 thereof;

Fig. 9 is a plan view of the structure illustrated in Fig. 7, and

Fig. 10 is a view of structure, similar to that illustrated in Fig. 7, showing a further form of the invention.

Referring to Figs. 1 to 3, a chuck is illustrated mounted on a slide 12 which is supported on spaced bars 13. The slide has an aperture 14 for supporting spaced bearings 15 in which a shaft 16 is rotated. The aperture 14 is sealed at the ends by sealing elements 17. Driving means, such as a pulley 18 mounted on one end of the shaft, produces the rotation of the shaft, and a chuck 19 of the present invention is mounted on the opposite end of the shaft.

The chuck 19 is made up of a plate 21 which is secured to the end of the shaft 16 or which is integral therewith. The shaft and the plate have a central opening 22 in which a rod 23 is mounted for reciprocation. The plate 21 has a ring 24 secured thereto by screws 25. The ring 24 has a recess 26 therein in which a ring 27 is mounted for rotation. Oppositely disposed, diametrically aligned pins 28 are secured in apertures in the rings 27 and extend from slots 29 in the ring 24. The extending ends of the pins project through cam slots 31 of a cup 32 which is mounted for vertical movement centrally of the ring 24. A ring 33 is secured to the ring 24 and a plurality of flexible spring fingers 35 are secured to the inner peripheral wall by pairs of jaw elements 36 locked in position by wedge elements 37. Screws 38 draw the wedges firmly between the jaws and lock the jaws securely on the adjacent ends of the fingers. The fingers are radially disposed and the inner ends thereof define the periphery of a circle. Between each of the adjacent fingers, a pin 39 extends upwardly from the ring 27 in which the pins are supported in fixed relation. The pins 39 are located adjacent to the ends of the spring fingers 35 which are deflected by the pins when the ring 27 is angularly moved, to thereby increase the circle defined by the spring ends. This permits a cylindrical workpiece to be clamped by the ends of the fingers and to be released therefrom so that it may be removed from the chuck.

The screw 41 secures the cup 32 to the end of the reciprocal rod 23, the upper movement of which moves the cup upwardly and the cam slots 31 over the ends of the pins 28, which thereby angularly shifts the ring 27 and causes the pins 39 to deflect the ends of the spring fingers 35. Thereafter, the pin rides down in a vertical portion 42 of the slots 31, permitting the upper end of the cup to engage the unclamped workpiece 43 and move it upwardly above the fingers 35. When the rod is lowered, he cup moves downwardly, with the pins riding in the straight portion 42 of the slots 31, and after a workpiece has been disposed on the cup 32 and lowered onto the plate 21 adjacent to the deflected ends of the fingers 35, the further downward movement of the cup 32 moves the pins 28 in the cam slots 31 to angularly adjust the ring 27 in a reverse direction, thereby moving the pins 39 from engagement with the fingers 35, permitting the fingers to clamp the workpiece 43. The workpiece is hardened, requiring a honing or grinding operation to be performed thereon and is prevented from rotating by the tension of the fingers which function in the same manner as the fingers of a clutch to prevent the rotation of the workpiece in one direction, which is that away from the direction in which the fingers are slightly bent when engaging the peripheral wall of the workpiece.

In Fig. 4, a further form of the invention is illustrated, that wherein the plate 21 has a pair of diametrically disposed tapered pins 45 extending downwardly therefrom and the ring 27 has a pair of diametrically disposed tapered fingers 46 also extending downwardly therefrom adjacent to the fingers 45. The plate 21 has slots 47 therein in which the tapered fingers 46 are free to move when the ring 27 is rotated. An ejector cup 48 has diametrically disposed pins 49 which project between the tapered fingers 45 and 46 and move the fingers 46 away from the fingers 45 when moved upwardly by the rod 23, thereby rotating the ring 27 and causing the fingers 35 to be deflected to release the workpiece which is raised from the area between the fingers when the rod 23 is further moved upwardly. When the workpiece is removed and a new workpiece is placed on the cup 48, it is first lowered into the area of the fingers upon the initial downward movement of the cup, after which the pins 49 move further downwardly, permitting the ring 27 to be returned to its initial position, permitting the fingers to clamp the workpiece.

In Figs. 5 and 6, a still further form of the invention is illustrated, that wherein the ring 27 has diametrically disposed pins 51 projecting outwardly thereof through slots 52 in the periphery of the ring. Diametrically disposed pins 53 extend outwardly from the plate 21 adjacent to the pins 51. A ring 54 surrounds the plate 21 and carries diametrically disposed cam fingers 55 located between pins 51 and 53. The plate has an inwardly extending flange 56 at the bottom which rests upon a flange 57 supported by a shaft 58 on which the chuck is mounted. A pair of oppositely disposed jacklike elements 59 engages the ring 54 after the rotation of the shaft 58 is terminated to raise the ring 54 and cause the cam fingers 55 to move upwardly between the pins 51 and 53 to cause the pins 51 and ring 27 to shift to have the pins 39 deflect the ends of the spring fingers 35. An ejector cup 32 may be provided within the chuck, operated by a rod 23 for raising the workpiece from the area between the ends of the fingers 35.

Referring to Figs. 7, 8 and 9, a further form of the invention is illustrated, that wherein a cylindrical supporting element 61 has rings 62 and 63 secured thereto by a plurality of screws 64. The ring 63 has a plurality of spring fingers 35 secured thereon by wedging elements 65 and 66, the wedging element 66 being secured to the ring 63 by screws 67. A rotatable ring 68 is mounted on the ring 62 and has four pins 69 mounted on the inner peripheral wall in fixed relation thereto extending through slots 71 in the ring 62. Pins 39 extend upwardly from the ring 68 between the fingers 35 adjacent to the outer ends thereof. A cylindrical cup 72 is secured to a reciprocal rod 73, the cup having four arcuate slots 74 therein which receive the ends of the pins 69. When the rod 73 and the cup 72 are moved upwardly, the pins will deflect as the arcuate slot 74 passes thereover, rotating the ring 68 and advancing the pins 39 to deflect the ends of the fingers 35. This deflection of the ends of the fingers reduces the overall diameter of the finger ends so that a workpiece 77 which is clutched on the inner surface may be removed from the ends of the fingers. It will be noted that the ends of the fingers are notched at 78 and sloped at 79 to conform to the inner peripheral form of the ring 77.

In Fig. 10, a still further form of the invention is illustrated, that wherein a cylindrical member 81 supports rings 82 and 83, the latter of which supports spring fingers 35 in the manner described above with regard to the structure of Figs. 7, 8 and 9, to have the ends of the fingers engage the inner peripheral wall of the workpiece. A rotatable ring 84 is supported on the ring 82, the ring having the upwardly extending pins 39 located between the fingers 35. Oppositely disposed, downwardly extending, tapered pins 85 are threaded into the ring 84 and extend through elongated slots 86 in the ring 82. Additional tapered pins 87 are secured in the ring 82 directly adjacent to the pins 86. A reciprocal rod 88 has a ball end 89 on which a ring 91 is secured between a pair of plates 92, clamped about the ball 89. A pair of pins 93 is carried by the ring 91 extending outwardly between the tapered ends of the pins 85 and 87. When the rod is moved upwardly, the pins 93 wedge between the tapered ends of the pins 85 and 87 and cause the pin 85 to move away from the pins 87, thereby rotating the plate 84 which moves the pins 39 to deflect the fingers 35. The downward movement of the rod 88 permits the return of the pins 85 toward the pins 87 and the movement of the pins 39 away from the fingers 35, the ends of which engage the inner face of the workpiece and clamp it securely thereon.

In any of the chuck arrangements herein described, a ring is rotated by a camming action which deflects the spring fingers of the chuck and changes the diameter thereacross. The camming means are diametrically disposed so as to have the pressures balanced, thereby eliminating binding and friction which would otherwise occur. The additional movement provided to the reciprocable element raises the released workpiece from the area within the fingers so that it may be removed and a new ring positioned thereon. Upon the lowering of the element, the ring is seated in the area between the ends of the fingers and the further movement operates the cam mechanism which permits the spring fingers to move toward a radial position until the ends engage the surface of the workpiece and securely clamp it in position. This type of chuck and ejecting mechanism is of extreme importance for clamping hardened workpieces which are to be ground or honed since the clamping means cannot bite into the metal of the workpiece, and it is only through the spring frictional engagement of a plurality of fingers that the hardened workpiece may be securely clamped to permit such operations to be performed thereon.

What is claimed is:

1. A chuck having an element from which a plurality of fingers are radially disposed, with the ends of the fingers defining a circle, a rotatable plate having pins thereon, one disposed adjacent each finger, and reciprocal means having cam engagement with said plate for causing said plate to rotate upon the upward movement of said means for deflecting the ends of the fingers by said pins and unclamping the workpiece.

2. A chuck having an element from which a plurality of fingers are radially disposed, with the ends of the fingers defining a circle, a rotatable plate having pins thereon, one disposed adjacent each finger, and reciprocal means having cam engagement with said plate for causing said plate to rotate upon the upward movement of said means for deflecting the ends of the fingers by said pins and unclamping the workpiece, the further movement of said reciprocal means engaging the workpiece and raising it from the area of engagement with the fingers.

3. In a chuck mechanism, a ring, a plurality of spring fingers supported on the inner wall of said ring in fixed relation thereto, a rotatable ring beneath said first ring having a plurality of pins extending upwardly therefrom, each one disposed adjacent to one of said fingers, a workpiece ejecting cup centrally of said rings, a rod supporting said cup for reciprocal movement, and cam means between said cup and rotatable ring for causing said ring to rotate upon the initial upward movement of said cup and rod.

4. In a chuck mechanism, a ring, a plurality of spring fingers supported on the inner wall of said ring in fixed relation thereto, a rotatable ring beneath said first ring having a plurality of pins extending upwardly therefrom, each one disposed adjacent to one of said fingers, a workpiece ejecting cup centrally of said rings, a rod supporting said cup for reciprocal movement, and cam means between said cup and rotatable ring for causing said ring to rotate upon the initial upward movement of said cup and rod, the further movement of said rod after the workpiece is unclamped engaging the unclamped workpiece and raising it out of the area between said fingers.

5. In a chuck mechanism, a ring, a plurality of spring fingers supported on the inner wall of said ring in fixed relation thereto, a rotatable ring beneath said first ring having a plurality of pins extending upwardly therefrom, each one disposed adjacent to one of said fingers, a workpiece ejecting cup centrally of said rings, a rod supporting said cup for reciprocal movement, and cam means between said cup and rotatable ring for causing said ring to rotate upon the initial upward movement of said cup and rod, said fingers being radially disposed relative to the center of the supporting rings.

References Cited in the file of this patent

UNITED STATES PATENTS

| | | |
|---|---|---|
| 1,482,566 | Keller | Feb. 5, 1924 |
| 2,719,721 | Grobey | Oct. 4, 1955 |
| 2,741,481 | Ortegren | Apr. 10, 1956 |

FOREIGN PATENTS

| | | |
|---|---|---|
| 635,308 | Great Britain | Apr. 5, 1950 |